US010071795B2

(12) United States Patent
Perkins et al.

(10) Patent No.: US 10,071,795 B2
(45) Date of Patent: Sep. 11, 2018

(54) CLAMP DEVICE FOR USE WITH A DECOMPRESSION PANEL IN AN AIRCRAFT ASSEMBLY

(71) Applicant: The Boeing Company, Seal Beach, CA (US)

(72) Inventors: Thomas Perkins, Renton, WA (US); Michael J. Olliges, Mill Creek, WA (US); Allan A. Loken, Kent, WA (US); Hannah Rebecca Arm, Renton, WA (US); Jeremy Ryan Glaze Tatum, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 35 days.

(21) Appl. No.: 14/228,492

(22) Filed: Mar. 28, 2014

(65) Prior Publication Data
US 2015/0117945 A1    Apr. 30, 2015

Related U.S. Application Data

(60) Provisional application No. 61/895,698, filed on Oct. 25, 2013.

(51) Int. Cl.
*F16B 5/06* (2006.01)
*B64C 1/18* (2006.01)
(Continued)

(52) U.S. Cl.
CPC ............... *B64C 1/18* (2013.01); *B64D 11/02* (2013.01); *F16B 5/0635* (2013.01);
(Continued)

(58) Field of Classification Search
CPC ..... B64C 2001/009; B64C 1/069; B64C 1/18; B64C 1/14; Y10T 403/7067;
(Continued)

(56) References Cited

U.S. PATENT DOCUMENTS 1,081,195 A    12/1913 Austin
1,327,011 A  *  1/1920 Arndt ................... F16B 2/065
                                                    220/328
(Continued)

FOREIGN PATENT DOCUMENTS

DE             114647 C       3/1899
DE          1753273 A1        3/1971
(Continued)

OTHER PUBLICATIONS

International Search Report and Written Opinion issued in International Application No. PCT/US2014/050645, dated Nov. 13, 2014.
(Continued)

*Primary Examiner* — Josh Skroupa
*Assistant Examiner* — Matthew R McMahon
(74) *Attorney, Agent, or Firm* — Armstrong Teasdale LLP

(57) ABSTRACT

A clamp device includes a clamp portion defining a threaded opening therein. The clamp portion is configured to contact a first side of a beam. The clamp device also includes a threaded fastener configured for insertion into the threaded opening via a hole defined within the decompression panel. The clamp device causes the decompression panel to contact a second side of the beam when the threaded fastener is tightened within the threaded opening.

22 Claims, 6 Drawing Sheets

(51) Int. Cl.
*B64D 11/02* (2006.01)
*B64C 1/00* (2006.01)
*F16B 2/12* (2006.01)

(52) U.S. Cl.
CPC ...... *F16B 5/0685* (2013.01); *B64C 2001/009* (2013.01); *F16B 2/12* (2013.01); *Y10T 29/49948* (2015.01); *Y10T 403/7067* (2015.01)

(58) Field of Classification Search
CPC ........... Y10T 403/4674; Y10T 292/218; Y10T 292/221; Y10T 292/223; Y10T 403/4685; F16B 5/0607; F16B 5/0685; F16B 5/0635; F16B 37/122; F16B 2/12; F16B 5/121; B65D 45/10; B65D 45/305; B65D 45/04
USPC .......................... 296/100.04, 100.07, 100.09
See application file for complete search history.

(56) References Cited

U.S. PATENT DOCUMENTS

| | | | |
|---|---|---|---|
| 1,793,261 A * | 2/1931 | Stieglitz | E05B 65/006 292/256.71 |
| 1,978,642 A * | 10/1934 | MacLean | E04B 5/10 29/897.3 |
| 2,395,233 A | 2/1946 | Richardson | |
| D153,487 S | 4/1949 | Adam | |
| 2,501,722 A * | 3/1950 | Hammerly | B60R 13/0206 220/241 |
| 2,859,841 A | 11/1958 | Reed | |
| 2,925,050 A | 2/1960 | Candlin, Jr. et al. | |
| 3,023,041 A * | 2/1962 | Pluylaar | E05C 3/042 292/212 |
| 3,116,081 A * | 12/1963 | Goodridge | F16B 5/0642 292/212 |
| D201,653 S | 7/1965 | Person | |
| 3,571,977 A | 3/1971 | Abeel | |
| 4,033,247 A | 7/1977 | Murphy | |
| 4,066,212 A * | 1/1978 | Sonneville | E01B 9/306 238/349 |
| 4,133,852 A | 1/1979 | Dinicolantonio et al. | |
| 4,353,503 A * | 10/1982 | Duchemin | E01B 9/306 238/338 |
| 4,390,152 A | 6/1983 | Jorgensen | |
| 4,432,514 A | 2/1984 | Brandon | |
| 4,432,538 A * | 2/1984 | Sequin | B25B 5/061 269/92 |
| RE32,554 E | 12/1987 | Murphy | |
| 4,728,235 A * | 3/1988 | Patti | F16B 2/065 411/174 |
| 4,819,548 A | 4/1989 | Horstman | |
| 4,899,960 A | 2/1990 | Hararat-Tehrani et al. | |
| 5,025,987 A * | 6/1991 | Kotecki | E01B 9/28 238/342 |
| 5,046,686 A | 9/1991 | Carla et al. | |
| 5,085,017 A | 2/1992 | Hararat-Tehrani | |
| 5,118,053 A | 6/1992 | Singh et al. | |
| 5,137,231 A | 8/1992 | Boss | |
| 5,331,119 A * | 7/1994 | Leger | H04R 1/025 181/150 |
| D351,903 S | 10/1994 | Whitley, II | |
| D353,193 S | 12/1994 | Porter | |
| D358,205 S | 5/1995 | Ruhland | |
| 5,606,829 A | 3/1997 | Hararat-Tehrani | |
| D390,948 S | 2/1998 | Meyer | |
| D393,708 S | 4/1998 | Assadi | |
| 5,792,230 A | 8/1998 | Moore et al. | |
| 5,827,026 A * | 10/1998 | Patti | F16B 2/065 411/112 |
| D402,356 S | 12/1998 | Hodge | |
| 5,871,178 A | 2/1999 | Barnett et al. | |
| 6,029,933 A | 2/2000 | Holman et al. | |
| 6,129,312 A | 10/2000 | Weber | |
| 6,129,856 A | 10/2000 | Jung et al. | |
| 6,261,042 B1 * | 7/2001 | Pratt | F16B 5/10 411/551 |
| 6,264,141 B1 | 7/2001 | Shim et al. | |
| 6,290,445 B1 | 9/2001 | Duran | |
| D456,066 S | 4/2002 | Ching | |
| 6,435,455 B1 | 8/2002 | Holman et al. | |
| 6,450,415 B1 * | 9/2002 | Kirchner | F16B 2/065 238/315 |
| D466,605 S | 12/2002 | Ziegler | |
| D469,889 S | 2/2003 | O'Hagin | |
| 6,601,356 B2 | 8/2003 | Snyder | |
| 6,702,230 B2 | 3/2004 | Movsesian et al. | |
| D493,880 S | 8/2004 | Achen | |
| 6,817,941 B1 | 11/2004 | Gatov | |
| D504,172 S | 4/2005 | O'Hagin | |
| D507,048 S | 7/2005 | Achen | |
| D517,193 S | 3/2006 | Calkins | |
| 7,021,855 B2 * | 4/2006 | Hardtke | F16B 2/065 403/168 |
| D520,626 S | 5/2006 | Angers et al. | |
| 7,093,811 B2 * | 8/2006 | Wu | G03B 17/02 248/229.12 |
| 7,207,524 B2 | 4/2007 | Puschmann et al. | |
| 7,234,894 B1 | 6/2007 | Flury | |
| 7,303,800 B2 * | 12/2007 | Rogers | B32B 3/02 404/34 |
| D576,723 S | 9/2008 | Achen | |
| D578,633 S | 10/2008 | Schluter et al. | |
| D581,487 S | 11/2008 | Wildfang | |
| D582,029 S | 12/2008 | Achen | |
| D589,605 S | 3/2009 | Reedy et al. | |
| D592,584 S | 5/2009 | Schuephaus et al. | |
| D597,653 S | 8/2009 | Calkins | |
| 7,568,659 B2 | 8/2009 | Roques et al. | |
| D601,481 S | 11/2009 | Barrou | |
| D606,183 S | 12/2009 | Rosenbohm | |
| D607,989 S | 1/2010 | Llana Garcia | |
| D608,269 S | 1/2010 | Aruga et al. | |
| D614,753 S | 4/2010 | DeFelice | |
| D614,754 S | 4/2010 | DeFelice et al. | |
| D617,254 S | 6/2010 | Guard et al. | |
| D621,924 S | 8/2010 | Achen | |
| 7,997,533 B2 | 8/2011 | Muller | |
| D657,858 S | 4/2012 | Platt | |
| 8,201,775 B2 | 6/2012 | Treimer et al. | |
| 8,393,577 B2 | 3/2013 | Roth et al. | |
| 8,397,352 B2 | 3/2013 | Langediers et al. | |
| 8,460,419 B1 | 6/2013 | Hobbs | |
| 8,511,736 B2 * | 8/2013 | Williamson | B60J 7/1607 224/558 |
| D693,756 S | 11/2013 | Stevens | |
| 8,651,924 B1 | 2/2014 | Jones et al. | |
| 8,696,418 B1 * | 4/2014 | Griffin | B64D 13/00 454/76 |
| 8,714,483 B2 * | 5/2014 | Hoetzeldt | B64C 1/18 244/118.5 |
| 8,777,537 B2 * | 7/2014 | Fritsch | F16B 5/02 411/338 |
| D718,434 S | 11/2014 | Diamond | |
| D719,895 S | 12/2014 | Fissette et al. | |
| 8,899,374 B2 * | 12/2014 | Tanaka | H04R 1/026 181/150 |
| D723,675 S | 3/2015 | Paskow | |
| D726,093 S | 4/2015 | Perkins et al. | |
| D731,950 S | 6/2015 | Fissette et al. | |
| 9,061,566 B2 | 6/2015 | Hoehn | |
| 9,086,185 B2 * | 7/2015 | Haddock | F16M 13/02 |
| D739,002 S | 9/2015 | Carroll | |
| 9,233,747 B2 | 1/2016 | Perkins et al. | |
| 9,249,570 B2 * | 2/2016 | Jean | E04B 5/023 |
| D763,432 S | 8/2016 | Carroll | |
| 9,440,744 B2 | 9/2016 | Perkins et al. | |
| D770,356 S | 11/2016 | Chantal et al. | |
| D772,138 S | 11/2016 | Sethapun et al. | |
| 9,499,251 B2 | 11/2016 | Perkins et al. | |
| D776,249 S | 1/2017 | Carroll | |
| D776,801 S | 1/2017 | Tamura et al. | |

(56) References Cited

U.S. PATENT DOCUMENTS

| | | | |
|---|---|---|---|
| D779,051 S | 2/2017 | Carroll | |
| 9,566,759 B2 | 2/2017 | Perkins et al. | |
| D784,511 S | 4/2017 | Jonas et al. | |
| D784,512 S | 4/2017 | Jonas et al. | |
| D796,661 S | 9/2017 | Oswald, Jr. | |
| 9,751,609 B2 | 9/2017 | Perkins et al. | |
| 2003/0168553 A1 | 9/2003 | Diehl et al. | |
| 2003/0222175 A1 | 12/2003 | Movsesian et al. | |
| 2004/0172889 A1 | 9/2004 | Eijkelenberg et al. | |
| 2004/0227311 A1* | 11/2004 | Sanders | A63C 5/075 280/14.22 |
| 2005/0202692 A1 | 9/2005 | Zeuner | |
| 2006/0102571 A1* | 5/2006 | Foy | F16M 13/02 211/75 |
| 2006/0240765 A1 | 10/2006 | Cheng | |
| 2007/0131597 A1 | 6/2007 | Chen | |
| 2008/0308705 A1* | 12/2008 | Sharp | H04R 1/02 248/544 |
| 2009/0008502 A1 | 1/2009 | Lynas | |
| 2009/0179110 A1 | 7/2009 | Leyens | |
| 2010/0058691 A1 | 3/2010 | Mannion | |
| 2010/0096500 A1 | 4/2010 | Benthien | |
| 2010/0101176 A1* | 4/2010 | Metham | E04B 5/023 52/698 |
| 2010/0187358 A1 | 7/2010 | Voss et al. | |
| 2010/0275410 A1* | 11/2010 | Chang | E05D 5/0246 16/277 |
| 2010/0320318 A1 | 12/2010 | Roth et al. | |
| 2011/0017742 A1 | 1/2011 | Sausen et al. | |
| 2011/0041293 A1 | 2/2011 | Langediers | |
| 2012/0043421 A1 | 2/2012 | Voss et al. | |
| 2012/0234973 A1* | 9/2012 | Hoetzeldt | B64C 1/18 244/118.5 |
| 2013/0075525 A1 | 3/2013 | Roth | |
| 2013/0139374 A1 | 6/2013 | Eilken | |
| 2013/0161462 A1* | 6/2013 | Haddock | F16M 13/02 248/237 |
| 2013/0343817 A1* | 12/2013 | Schilling | F16B 2/12 403/374.3 |
| 2014/0082977 A1* | 3/2014 | Pilon | E02F 9/2833 37/453 |
| 2014/0325824 A1* | 11/2014 | Pacini | F16B 5/0621 29/525.01 |
| 2015/0043965 A1* | 2/2015 | Mao-Cheia | E05D 5/0246 403/338 |
| 2015/0087217 A1 | 3/2015 | Switzer et al. | |
| 2015/0115102 A1 | 4/2015 | Perkins et al. | |
| 2015/0115103 A1 | 4/2015 | Perkins et al. | |

FOREIGN PATENT DOCUMENTS

| | | | |
|---|---|---|---|
| DE | 20121449 U1 | 9/2002 | |
| DE | 202011050619 U1 * | 10/2011 | F16B 2/12 |
| DE | 202011100835 U1 * | 8/2012 | F16B 5/0685 |
| EP | 0905018 A2 | 3/1999 | |
| EP | 1498571 A1 * | 1/2005 | E06C 1/34 |
| GB | 2312740 A | 5/1997 | |

OTHER PUBLICATIONS

International Search Report and Written Opinion of International Application No. PCT/US2014/040844, dated Feb. 20, 2015, 11 pages.

International Search Report and Written Opinion of International Application No. PCT/US2014/038606, dated Mar. 11, 2015, 13 pages.

International Preliminary Report on Patentablity and Written Opinion for related application PCT/US2014/050645, dated May 6, 2016; 8 pp.

International Preliminary Report on Patentablity and Written Opinion for related application PCT/US2014/050676, dated May 3, 2016; 7 pp.

International Preliminary Report on Patentablity and Written Opinion for related application PCT/US2014/038606, dated Apr. 28, 2016; 9 pp.

* cited by examiner

CLAMP DEVICE FOR USE WITH A DECOMPRESSION PANEL IN AN AIRCRAFT ASSEMBLY

CROSS REFERENCE TO RELATED APPLICATIONS

This application claims priority to U.S. Provisional Application No. 61/895,698 filed Oct. 25, 2013, which is hereby incorporated by reference in its entirety.

BACKGROUND

The field of the present disclosure relates generally to aircraft assemblies and, more specifically, to decompression panels for use in aircraft assemblies.

At least some known aircraft include several openings defined between a passenger compartment and adjacent compartments of an aircraft cabin. Such known openings serve a dual purpose. During normal operation, the openings define an air flow path that enables conditioned air to be circulated through the aircraft cabin. During a decompression event, the openings allow large quantities of air to flow therethrough to facilitate equalizing the pressure within the aircraft cabin.

In at least some known aircraft, the openings are covered with several panels including a grille and/or louvers. At least one known method of installing the panels in the aircraft cabin includes shingling the panels together. However, such method does not provide positive retention between adjacent panels nor positive retention between panels and interfacing airplane components. Without positive retention, passengers may deflect panel surfaces to access areas behind the panel. Moreover, the panels may migrate during flight and expose gaps in the cabin.

Another method of installation includes coupling the panels to aircraft crease beams using clamping mechanisms that rotate or swing into place such that pads positioned against opposing sides of the crease beam hold the panel in place. However, such clamping mechanisms assume a uniform thickness of the crease beams, but crease beams actually have differing thicknesses. As such, the clamping force applied by the clamping mechanisms may vary throughout the cabin.

BRIEF DESCRIPTION

In one aspect, a clamp device for use with a decompression panel is provided. The clamp device includes a clamp portion defining a threaded opening therein. The clamp portion is configured to contact a first side of a beam. The clamp device also includes a threaded fastener configured for insertion into the threaded opening via a hole defined within the decompression panel. The clamp device causes the decompression panel to contact a second side of the beam when the threaded fastener is tightened within the threaded opening.

In another aspect, an aircraft is provided. The aircraft includes a beam including a first side and an opposing second side and a decompression panel coupled to the beam. A clamp device is coupled to the beam and to the decompression panel. The clamp device includes a clamp portion defining a threaded opening therein, wherein the clamp portion is configured to be coupled to the first side. The clamp device also includes a threaded fastener configured for insertion into the threaded opening through the decompression panel. The clamp device causes the decompression panel to contact the second side when the threaded fastener is rotated within the threaded opening.

In yet another aspect, a method of fastening a decompression panel to a beam is provided. The beam includes a first side and a second side. The method includes positioning a decompression panel proximate the beam and positioning a clamp portion on the first side, wherein the clamp portion includes a threaded opening defined therein. A threaded fastener is then inserted through the decompression panel into the threaded opening and rotated such that the clamp device causes the decompression panel to contact the second side of the beam.

DETAILED DESCRIPTION

The implementations described herein relate to a clamp device for use in an aircraft assembly. More specifically, the clamp device includes a clamp portion that applies an axial clamping force when a fastener is tightened or rotated within the clamp portion. When the axial clamping force is applied, a pad coupled to the clamp portion is configured to interface with a crease beam of an aircraft and couple a decompression panel to the crease beam. The axial clamp force enables the clamp device to apply a consistent clamping force for a variety of crease beam thicknesses. Moreover, the axial clamping creates a secure coupling between the decompression panel and the crease beam to restrict access to an area behind the decompression panel. Furthermore, the threaded fastener is configured with a drive system that prevents passengers from unauthorized removal of the docompression panels.

Figure 1:
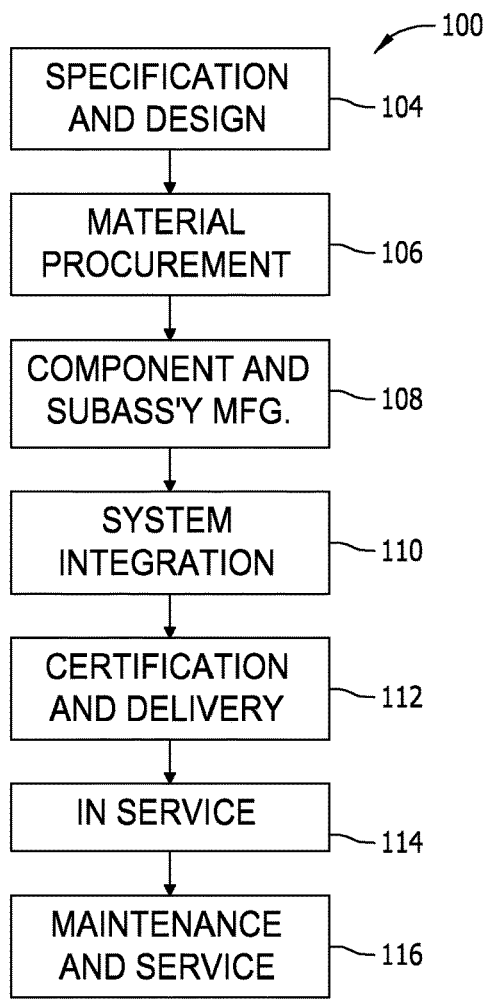
FIG. 1 is a flow diagram of an exemplary aircraft production and service methodology.
Figure 2:
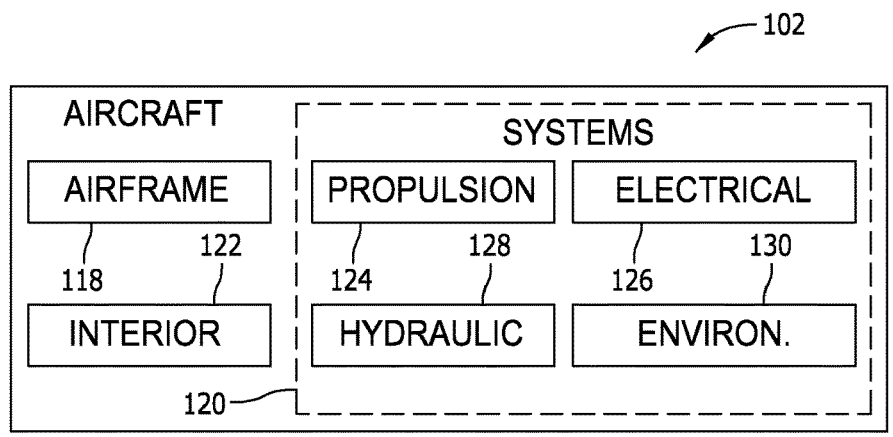
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
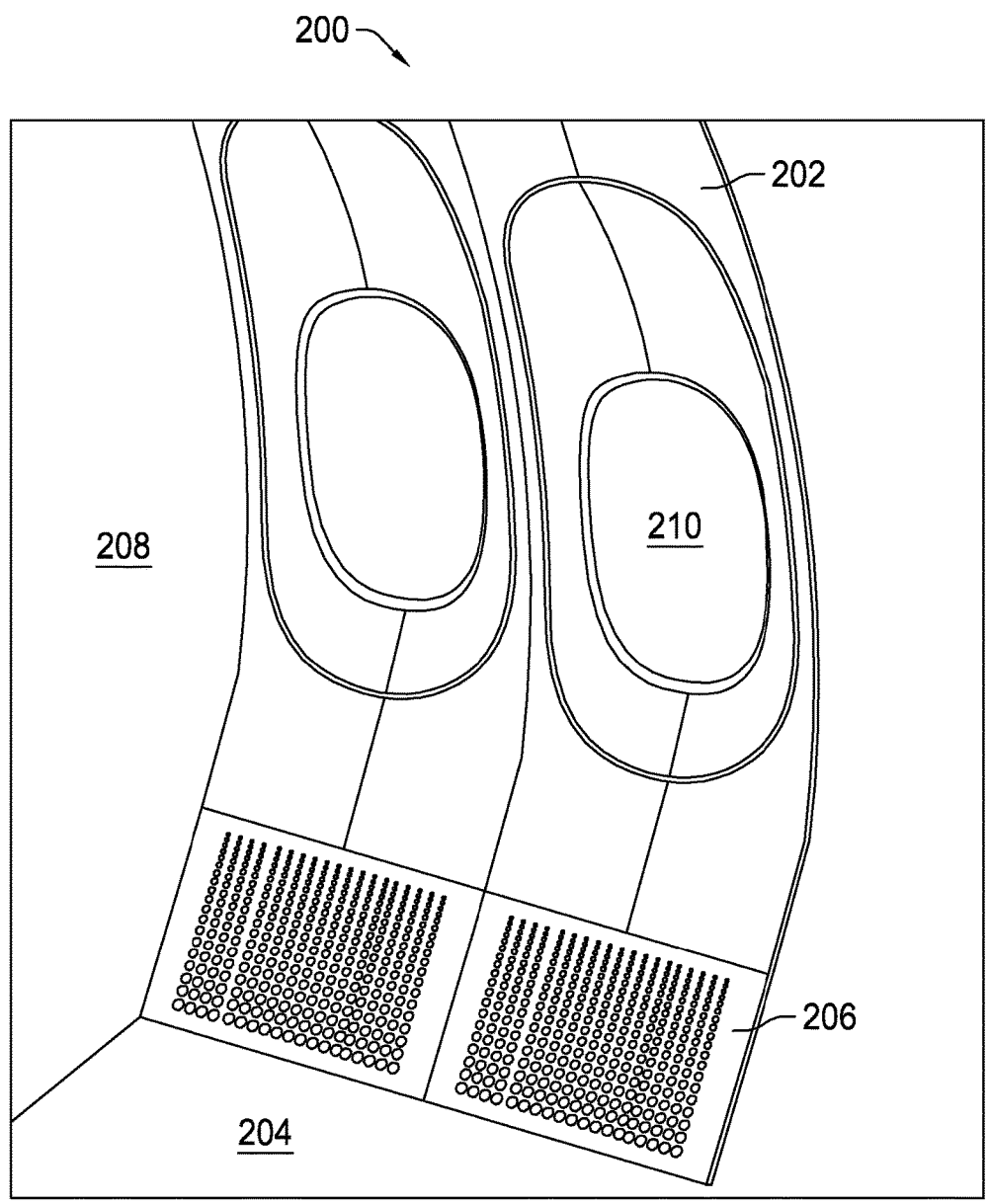
FIG. 3 is a perspective sectional view of an exemplary aircraft cabin.

FIG. 3 is a perspective sectional view of an exemplary aircraft cabin 200 that may be used with aircraft 102. In the exemplary implementation, aircraft cabin 200 includes a side wall 202, a floor panel 204, and decompression panels 206 coupled therebetween that at least partially define an interior 208 of aircraft cabin 200. Side wall 202 also includes a window opening 210 defined therein. In operation, decompression panels 206 facilitate circulating conditioned air through aircraft cabin 200 and/or facilitate equalizing the pressure in aircraft cabin 200 during a decompression event.

Figure 4:
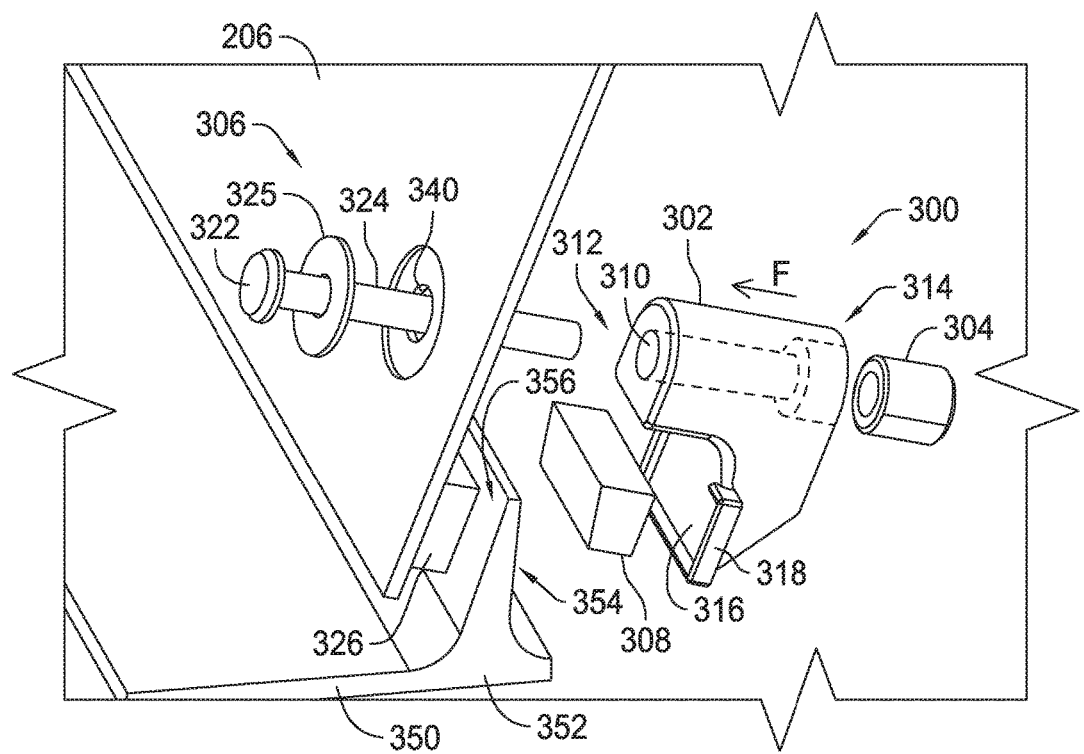
FIG. 4 is an exploded view of an exemplary clamp device that may be used with the decompression panel shown in FIG. 3.

FIG. 4 is an exploded view of a clamp device 300 that may be used with decompression panel 206.

In the exemplary implementation, clamp device 300 includes a clamp portion 302, a threaded insert 304, a fastener 306, and a first pad 308. Clamp portion 302 defines a threaded opening 310 therein extending from a clamp portion first end 312 to a clamp portion second end 314. At second end 314, opening 310 has a cross-sectional area that is greater than a cross-sectional area of opening 310 at first end 312 to facilitate receiving threaded insert 304 therein. Clamp portion 302 also includes a clamp head 316 for receiving and securing first pad 308 in position against a crease beam 350. Crease beam 350 includes a flange 352 having a first, outboard side 354 and a second inboard side 356. Clamp head 316 includes molded sidewalls 318 that align and retain first pad 308.

In the exemplary implementation, fastener 306 is a bolt or screw that includes a drive portion 322 and a threaded portion 324. Threaded portion 324 is configured to engage with threaded insert 304. More specifically, fastener 306 is inserted through a hole 340 defined in decompression panel 206 from interior 208 of aircraft cabin 200 (shown in FIG. 3). Drive portion 322 has any drive design that enables clamp device 300 to function as described herein. In the exemplary implementation, drive portion 322 includes one of a hex socket, a security hex socket (pin-in-hex socket), a torx, a security torx, or a tri-wing style of fastener drive. In an alternative implementation, drive portion may have a design that is customized for a particular purchaser. As such, a customized tool is necessary to install and/or remove fastener 306 and it will be more difficult for the passengers to remove decompression panel 206 to access behind panel 206 from interior 208. As fastener 306 is rotated within threaded insert 304, a clamping force F pulls clamp portion 302 toward decompression panel 206 in an axial direction. In some embodiments, a washer 325 may be provided between fastener 306 and decompression panel 206 to distribute a load applied when torque is applied to engage fastener 306 with threaded insert 304. In an alternative implementation, decompression panel 206 may include geometry such that drive portion 322 is contained concentric to panel opening 340 without threaded portion 324 extended through opening 340.

In the exemplary implementation, first pad 308 may be fabricated from any suitable material. Exemplary materials include, but are not limited to, silicone-based materials and rubber-based materials. First pad 308 is coupled to clamp head 316 and is configured to interface with flange first side 354 when fastener 306 is tightened via rotation. In some implementations, a second pad 326 may be provided between decompression panel 206 to interface with flange second side 356.

Figure 5:
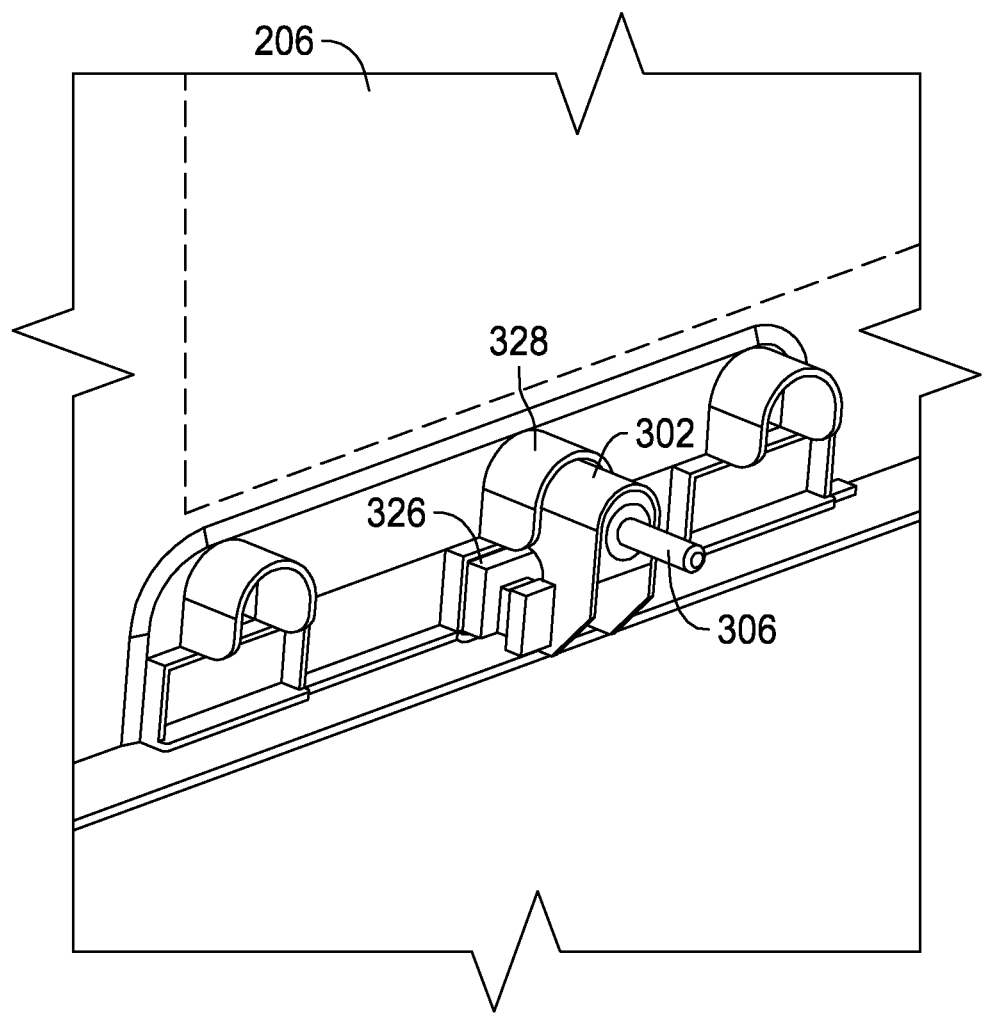
FIG. 5 is a perspective view of a portion of the clamp device shown in FIG. 4 including a guide feature.

FIG. 5 is a perspective view of a portion of decompression panel 206 including at least one guide feature 328. In the exemplary implementation, guide feature 328 is coupled to decompression panel 206 above hole 340. Guide feature 328 has a shape that corresponds to first end 312 of clamp portion 302. Guide feature 328 is configured to receive first end 312 of clamp portion 302 and prevent clamp device 300 from rotating as fastener 306 is tightened. Alternatively, guide feature 328 may have any geometry that restrains angular orientation and translational position of clamp device 300 relative to panel opening 340. Multiple guide features may be included in panel 206 such that clamp device 300 may be modularly installed at alternative locations in order to be compatible with variations in crease beam 350 geometry.

Figure 6:
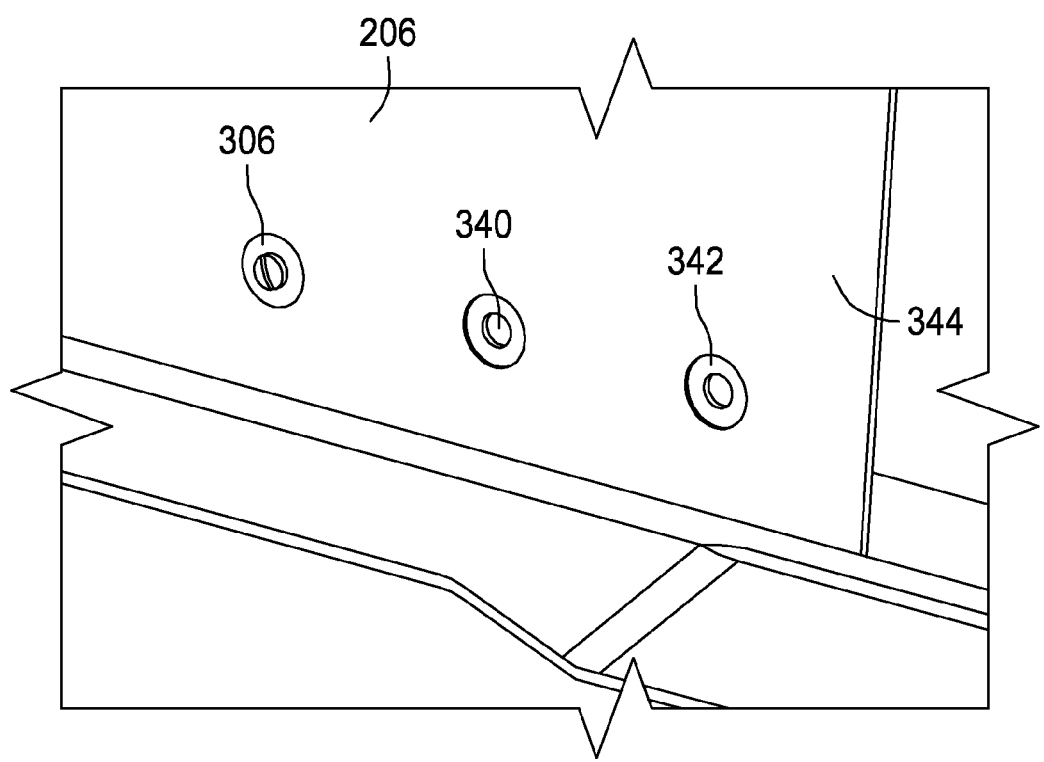
FIG. 6 is a perspective view of the decompression panel shown in FIG. 3 including a plurality of holes.

FIG. 6 is a perspective view of decompression panel 206 including a plurality of holes. Decompression panel 206 includes a plurality of holes 340 at various locations along decompression panel 206 for receiving clamp device 300. Having a plurality of holes 340 enables a position of clamp device 300 to be adjusted for different configurations of crease beams 350. A self-adhesive patch 342, such as TEDLAR® (TEDLAR is a registered trademark of E.I. du Pont de Nemours and Company, Wilmington, Del.), is provided to cover any unused hole 340. Patch 342 is configured to mimic a color and/or a texture of a decorative surface on and interior side 344 of decompression panel 206. As such, multiple holes 340 are provided to support modular installation of clamp feature 300 at alternative locations without affecting visual aesthetics of decompression panel 206.

Figure 7:
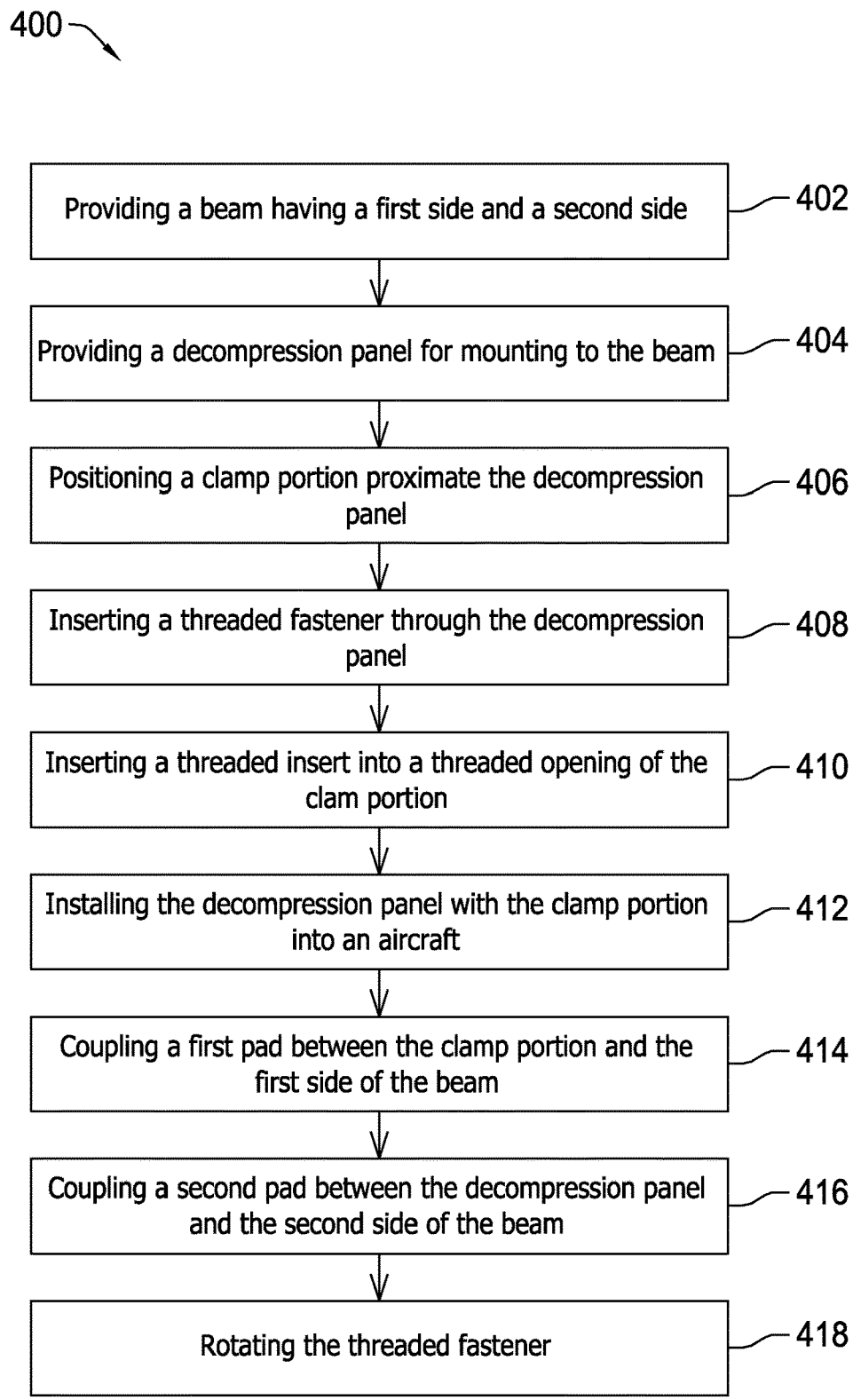
FIG. 7 is a schematic flow diagram of a method of fastening the decompression panel using clamp device shown on FIG. 4.

FIG. 7 is a schematic flow diagram of a method 400 of fastening a decompression panel, such as decompression panel 206 (shown in FIG. 3), to a beam, such as crease beam 350 (shown in FIG. 4), using a clamp device, such as clamp device 300 (shown in FIG. 4). Method 400 includes providing 402 a beam having a first side, such as outboard side 354 (shown in FIG. 4), and a second side, such as inboard side 356 (shown in FIG. 4). Method 400 also includes providing 404 the decompression panel for mounting to the beam and positioning 406 a clamp portion, such as clamp portion 302 (shown in FIG. 4), proximate the decompression panel. The clamp portion includes a threaded opening, such as threaded opening 310 (shown in FIG. 4), defined therein. A threaded fastener, such as threaded fastener 306 (shown in FIG. 4), is then inserted 408 through the decompression panel into the threaded opening.

Method 400 further includes inserting 410 a threaded insert, such as threaded insert 304 (shown in FIG. 4), into the threaded opening of the clamp portion, wherein the threaded fastener is inserted into a first end of the clamp portion and the threaded insert is inserted into an opposing second end of the clamp portion. Once the threaded fastener, clamp, and decompression panel are thus assembled, the decompression panel is installed into an aircraft cabin relative to a sidewall, such as sidewall 202 (shown in FIG. 3) and the crease beam. As such, at least a portion of the clamp device and the decompression panel are pre-assembled prior to installing 412 the decompression panel into the aircraft such that the clamp portion is proximate the first side. This is advantageous because it avoids a maintenance technician having to assemble the clamp device in place and allows the technician to simply position the pads and tighten the fastener, as described below.

A first pad, such as first pad 308 (shown in FIG. 4), is then coupled 414 between the clamp portion and the first side of the beam, and a second pad, such as second pad 326 (shown in FIG. 4), is coupled 416 between the decompression panel and the second side of the beam. Method also includes rotating 418 the threaded fastener such that the clamp device causes the decompression panel to contact the second side of the beam.

The clamp device described herein includes a clamp portion that applies an axial clamping force when a fastener is tightened within the clamp portion, and facilitates at least one of (a) applying a consistent clamping force for a variety of crease beam thicknesses; (b) increasing a strength and a mechanical stability of a coupling between a decompression panel and the crease beam; (c) reducing clamping pad damage; and (d) restricting access to areas behind the decompression panel; and (e) providing multiple configurable locations per panel to accommodate beam geometry variations.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A clamp device for use with a decompression panel, said clamp device comprising:
   a clamp portion comprising:
      a fastening portion comprising a first end, a second end, and an opening defined therethrough, wherein said fastening portion is continuous in a first horizontal direction between said first end and said second end along the opening, wherein said fastening portion is configured to couple directly to the decompression panel, and wherein said fastening portion comprises a first width in a second horizontal direction that is perpendicular to the first horizontal direction; and
      a clamp head configured to be coupled to a first side of a beam, wherein said clamp head is positioned between and spaced from said first end and said second end, wherein said clamp head comprises a first portion having a second width in the second horizontal direction that is wider than said first width and a second portion having a third width equal to the first width, said second portion extending from said first portion toward said second end, wherein said clamp head extends only a partial circumferential distance about said fastening portion, wherein said clamp portion comprises a unitary, single-piece component; and
   a threaded fastener configured for insertion into the opening via a hole defined within the decompression panel, wherein said clamp device causes the decompression panel to couple with a second side of the beam when said threaded fastener is rotated within the opening.

2. The clamp device in accordance with claim 1, wherein a diameter of the opening at said first end is smaller than a second diameter of the opening at said second end.

3. The clamp device in accordance with claim 2 further comprising a threaded insert configured for insertion into the opening at said second end, wherein the threaded fastener is configured to be inserted into said first end and to engage said threaded insert.

4. The clamp device in accordance with claim 1 further comprising:
   at least one spacing member configured to contact the beam, wherein said at least one spacing member is separable from said clamp portion and is formed from a resilient material.

5. The clamp device in accordance with claim 4, wherein said at least one spacing member comprises:
   a first spacing member configured to contact said clamp head and the beam, and wherein said first spacing member is configured to be positioned under said fastening portion; and
   a second spacing member configured to contact the decompression panel and the beam, and wherein said second spacing member is configured to be positioned on an opposing side of the beam from said first spacing member.

6. The clamp device in accordance with claim 4, wherein said clamp head is configured to receive and secure said at least one spacing member against said first side of the beam.

7. The clamp device in accordance with claim 6, wherein said clamp head includes at least one molded sidewall configured to align and retain said at least one spacing member against said first side of the beam.

8. The clamp device in accordance with claim 1 wherein an entirety of said first end of said fastening portion is positioned vertically above and laterally offset from said clamp head.

9. The clamp device in accordance with claim 1 wherein said clamp head is offset from an entirety of said fastening portion such that said fastener does not extend into said clamp head.

10. An aircraft comprising:
a beam comprising a first side and an opposing second side;
a decompression panel coupled to said beam; and
a clamp device coupled to said beam and to said decompression panel, said clamp device comprising
a clamp portion comprising:
a fastening portion comprising a first end including a first end face, a second end including a second end face, and an opening extending from said first end to said second end in a first horizontal direction, wherein said fastening portion is continuous in the first horizontal direction between said first end and said second end along the opening, wherein said first end face is configured to couple to the decompression panel and said second end face is oriented parallel to said first end face, and wherein said fastening portion comprises a first width in a second direction that is perpendicular to the first horizontal direction; and
a clamp head configured to be coupled to said first side of said beam, wherein said clamp head comprises a second width that is wider than said first width in the second horizontal direction and extends only a partial circumferential distance about said fastening portion, wherein said clamp head is positioned between and spaced from said first end and said second end, wherein said clamp portion comprises a unitary, single-piece component; and
a threaded fastener configured for insertion into the opening via a hole defined within said decompression panel, wherein said clamp device causes said decompression panel to couple with said second side of the beam when said threaded fastener is rotated within the opening.

11. The aircraft in accordance with claim 10, wherein said decompression panel comprises a plurality of holes defined therein, said threaded fastener configured to be inserted through a first of said plurality of holes into said clamp portion.

12. The aircraft in accordance with claim 10, wherein said decompression panel includes a guide feature configured to receive an entirety of a top surface of said fastening portion to prevent said clamp portion from any rotation, wherein said guide feature and said top surface are correspondingly-shaped.

13. The aircraft in accordance with claim 10, wherein a diameter of the opening at said first end is smaller than a second diameter of the opening at said second end.

14. The aircraft in accordance with claim 13, wherein said clamp device further comprises a threaded insert configured for insertion into the opening at said second end, wherein said threaded fastener is configured to be inserted into said first end and to engage said threaded insert.

15. The aircraft in accordance with claim 10, wherein said clamp device further comprises:
a first spacing member contacting said clamp head and said beam, wherein said first spacing member is configured to be positioned under said fastening portion; and
a second spacing member contacting said decompression panel and said beam, wherein said second spacing member is configured to be positioned on an opposing side of said beam from said first spacing member, wherein said first and second spacing members are separate components and are formed from a resilient material.

16. The aircraft in accordance with claim 10, wherein said clamp head is configured to receive and secure a spacing member against said first side of said beam, wherein said clamp head includes at least one molded sidewall configured to align and retain said spacing member against said first side of said beam.

17. The aircraft in accordance with claim 10 wherein said decompression panel comprises a body portion comprising a top end and a bottom end and an array of openings formed in said body portion, wherein said array of openings progressively decrease in size along a height of said body portion from said bottom end towards said top end.

18. A method of fastening a decompression panel to a beam having a first side and a second side, said method comprising:
providing a decompression panel for mounting to the beam;
positioning a clamp portion proximate the decompression panel, wherein the clamp portion includes a fastening portion comprising a first end, a second end, and an opening defined therethrough, wherein the fastening portion is continuous in a first horizontal direction between the first end and the second end along the opening, and wherein the fastening portion includes a first end face at said first end configured to couple directly to the decompression panel and an opposing second end face at said second end oriented parallel to the first end face, the fastening portion includes a first width in a second horizontal direction that is perpendicular to the first horizontal direction, wherein the clamp portion also includes a clamp head positioned between and spaced from said first end and said second end and configured to be coupled to a first side of the beam, wherein the clamp head includes a second width that is wider than said first width in the second horizontal direction and extends only a partial circumferential distance about the fastening portion, wherein the clamp portion includes a unitary, single-piece component;
inserting a threaded fastener through the decompression panel into the opening; and
rotating the threaded fastener such that the clamp portion causes the decompression panel to couple with the second side of the beam.

19. The method in accordance with claim 18 further comprising coupling a guide feature to the decompression panel, wherein the guide feature is configured to receive an entirety of a top surface of the clamp portion to prevent the clamp portion from any rotation.

20. The method in accordance with claim 18 further comprising:
coupling a first spacing member between the clamp head and the first side of the beam, wherein the first spacing member is positioned under the fastening portion; and
coupling a second spacing member between the decompression panel and the second side of the beam, wherein said first and second spacing members are separate components and are formed from a resilient material.

21. The method in accordance with claim 20, wherein coupling a first spacing member between the clamp head and the first side of the beam further comprises coupling the first spacing member between the clamp head and the first side of the beam such that the clamp head is configured to receive and secure the first spacing member against the first side of the beam.

22. The method in accordance with claim 18 further comprising inserting a threaded insert into the opening of the clamp portion, wherein the threaded fastener is inserted into the first end of the fastening portion and the threaded insert is inserted into the second end of the fastening portion.

* * * * *